United States Patent [19]

Stencel

[11] Patent Number: 4,824,314

[45] Date of Patent: Apr. 25, 1989

[54] COMPOSITE FASTENER SYSTEM AND MANUFACTURING METHOD THEREOF

[75] Inventor: Edgar L. Stencel, Alta Loma, Calif.

[73] Assignee: Northrop Corporation, Hawthorne, Calif.

[21] Appl. No.: 14,903

[22] Filed: Jan. 28, 1987

Related U.S. Application Data

[63] Continuation-in-part of Ser. No. 702,783, Feb. 19, 1985, abandoned.

[51] Int. Cl.⁴ .............................................. F16B 35/00
[52] U.S. Cl. .................................... 411/378; 411/383; 411/395; 411/424; 411/479; 411/901; 411/908
[58] Field of Search ................ 411/378, 383, 395, 411, 411/424, 477–479, 900–904, 907, 908

[56] References Cited

U.S. PATENT DOCUMENTS

| | | | |
|---|---|---|---|
| 2,030,290 | 2/1936 | Friedman | 411/378 X |
| 2,181,835 | 8/1937 | Place | 411/900 X |
| 2,510,693 | 6/1950 | Green | 411/383 |
| 2,678,585 | 5/1954 | Ellis | 411/908 X |
| 2,962,813 | 12/1960 | Kreidler | 72/255 |
| 3,099,083 | 7/1963 | De Long | 411/902 |
| 3,296,048 | 1/1967 | Wolfe | 411/907 |
| 3,301,120 | 1/1967 | Loyd | 411/411 |
| 3,369,440 | 2/1968 | King, Jr. | 411/366 |
| 3,434,743 | 3/1969 | Boeker | 411/395 |
| 3,457,573 | 7/1969 | Patyna et al. | 411/395 X |
| 3,495,494 | 2/1970 | Scott | 411/411 |
| 3,520,222 | 7/1970 | Placek | 411/395 |
| 3,620,119 | 11/1971 | King, Jr. et al. | 411/900 |
| 3,974,012 | 8/1976 | Hogarth | 156/161 |
| 4,022,099 | 5/1977 | Ballantyne | 411/383 |
| 4,063,838 | 12/1977 | Michael | 403/343 |
| 4,178,413 | 12/1979 | DeMunda | 428/408 |
| 4,263,367 | 4/1981 | Prewo | 428/338 |
| 4,341,840 | 7/1982 | Prewo | 428/408 |
| 4,478,544 | 10/1984 | Strand | 411/901 |

FOREIGN PATENT DOCUMENTS

| | | | |
|---|---|---|---|
| 1084088 | 6/1960 | Fed. Rep. of Germany | 411/ |
| 2705336 | 8/1978 | Fed. Rep. of Germany | 411/424 |
| 6600258 | 7/1966 | Netherlands | 411/378 |
| 487251 | 1/1976 | U.S.S.R. | 411/900 |
| 545785 | 4/1977 | U.S.S.R. | 411/424 |
| 567862 | 8/1977 | U.S.S.R. | 411/378 |
| 721579 | 3/1980 | U.S.S.R. | 411/378 |

OTHER PUBLICATIONS

"Tool and Die Journal" Jul. 1944, pp. 196,198,200.

Primary Examiner—Gary L. Smith
Assistant Examiner—Suzanne L. Dino
Attorney, Agent, or Firm—Terry J. Anderson; Robert B. Block

[57] ABSTRACT

A method of forming a lightweight threaded fastener element of bimaterial construction to high tolerance requirements, the element formed by the steps of shaping a metal shell to a preliminary configuration blank by extrusion, filling the extruded shell with a less dense material such as a curable epoxy-graphite material or an aluminum-lithium alloy, further shaping the filled blank by forging both the core material and shell to an intermediate configuration which is finished by warm rolling to form a strong lightweight fastener element configured with the metal shell thereof which may be engageable with a cooperating metal fastener assembly member.

11 Claims, 1 Drawing Sheet

COMPOSITE FASTENER SYSTEM AND MANUFACTURING METHOD THEREOF

RIGHTS OF THE GOVERNMENT

This invention was made with Government support under Federal Contract No. F33657-81-C-0067 awarded by the United States Air Force. The Government has certain rights in this invention.

CROSS REFERENCE TO RELATED APPLICATION

This is a continuation-in-part of U.S. patent application No. 6/702,783 filed on Feb. 19, 1985 now abandoned.

FIELD OF THE INVENTION

This invention relates generally to strong, yet lightweight fastener elements, and a method of manufacture of such articles. More particularly, the fasteners are manufactured of a combination of a metal shell and lighter core materials to achieve close external dimensional tolerances with a good finish, high shear strength and tension loading capabilities.

THE PRIOR ART

For fastening together portions of certain highly stressed constructions, such as aircraft or other assemblies requiring high strength and light weight, many variations of fasteners have been suggested. Most of these prior art fasteners have been made of a core material to which a different material has been applied as a thin protective coating, as by plating, galvanizing, and other application methods. In these fasteners, the reduction in weight has caused a corresponding reduction in strength and/or the ability to withstand one or more of the other forces caused by the stresses to which the assembly may be subjected.

Attempts to overcome the disadvantages of the prior art fasteners have been successful in part but have introduced other shortcomings. Typically, a molded, non-metallic fastener having an external coating of metal provides a lightweight fastener, but is unlikely to have the desired strength to withstand severe stress and tension forces without a significant increase in size. Also, metal coated non-metallic fasteners typically cannot be used in conjunction with metallic structures since the relatively thin metallic coating can be quickly destroyed by the metallic structures, permitting the assembled structures to act against the more fragile core material. Thus, under the high stress conditions in which these fasteners may be used, failures can occur by cutting through or shearing the core.

U.S. Pat. No. 2,962,813 to Kreidler describes a method of mechanically encasing an inner component by embedding a core material in a encasing material of such thickness that it is capable of other manufacturing processes. However, before final processing, this inner component must first be provided with a manufactured head or some other predetermined shape. The inner component does not change shape during the application of the outer casing material. Neither of these requirements apply or are desirable in the present invention.

U.S. Pat. No. 3,620,119 to King describes the use of a metallic sleeve as a coating or barrier applied to smooth surfaces only, and desired to carry shear or compression loads only. The sleeve, which must be open at both ends to function in the manner for which it was designed, is applied by slipping or forcing the internal member, which is a machined component in its final or finished form, into the sleeve portion. Typically, this system may be used to repair damaged bolt holes in aircraft structure by putting the oversized sleeves on standard shank diameter bolts. The sleeve component forms to the shape configuration of the inner component, which is of greater hardness than the external sleeve, or just the opposite of the teaching of the present invention. In this invention, an increase in tensile and shear strength may be obtained by increasing the sleeve wall thickness without increasing the outside diameter. The present invention will withstand significantly greater shear, compression, tension, and fatigue forces than conventional metal coated non-metallic fasteners. The patented product of King can only increase in shear strength by increasing the outside diameter which is highly undesirable in aircraft structure, and would likely cause an increase in weight in a fastener according to the method of fabrication of the patent.

SUMMARY OF THE INVENTION

The present invention overcomes the problems associated with the prior art by providing lightweight fasteners having the tolerance, finish, shear strength and load transfer capabilities of solid metal fasteners while still having significantly less weight. Specifically, the fastener is constructed of a metallic outer shell, and a less dense core formed of materials such as an epoxy-graphite compound or an aluminimum-lithium alloy. Unlike conventional metal coated non-metallic fasteners the present inventive fastener can be easily assembled with a metallic component, such as a nut, without galling or scoring the outer metal shell so as to expose the core material. The outer metal shell is capable of being extruded and/or otherwise formed to a cylinder having thin walls of substantially uniform thickness, notwithstanding that portions of the shell wall may be left with a greater thickness if desired to provide for greater shear stress bearing capabilities in specific locations. In a preferred embodiment, one end of the shell is closed to retain the core material. Since the core is formed within the metal shell, the dimensions of the shell and its finish can be maintained to such critical tolerances as are normally associated with fasteners used in the aircraft construction and/or repair industries.

The thin metal shell and strong but lighter in weight core provide a significant savings in weight for an overall assembly in which many fasteners are required, as compared to the weight of more conventional solid metal fasteners. However, the shell eliminates a sensitivity to bending, shear and tension load transfer in the head and threaded area which is typically encountered with conventional metals coated non-metallic fasteners. With the fastener according to this invention, the metal shell provides greater load bearing and shear strength and can withstand greater forces without damage to the inner core than a fastener made entirely from the lighter core material. Further, the fastener can be finished to high precision and high dimensional tolerances with conventional or slightly modified machine tools. Also, the fastener can be used with conventional assembly tools to secure workpieces of conventional materials with only minor changes in workpiece assembly techniques.

DETAILED DESCRIPTION

Figure 1:
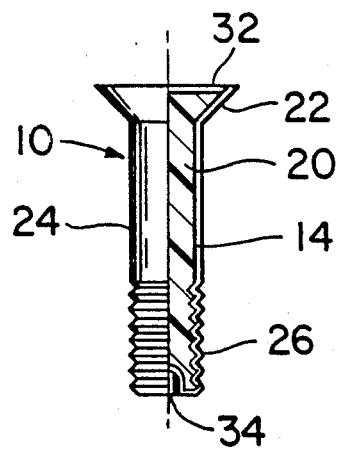
FIG. 1 is a perspective view of a fastener in accordance with the described invention, with portions broken away.
Figure 2:
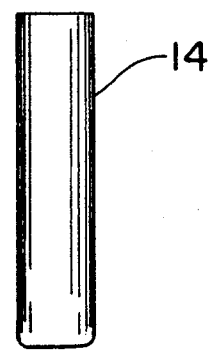
FIGS. 2-6 are cross-sectional views of the fastener at various stages during manufacture.
Figure 3:
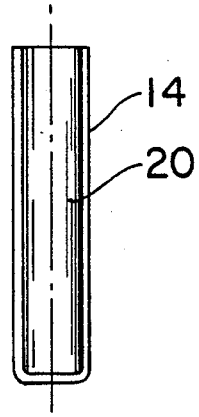
Figures 4, 5:
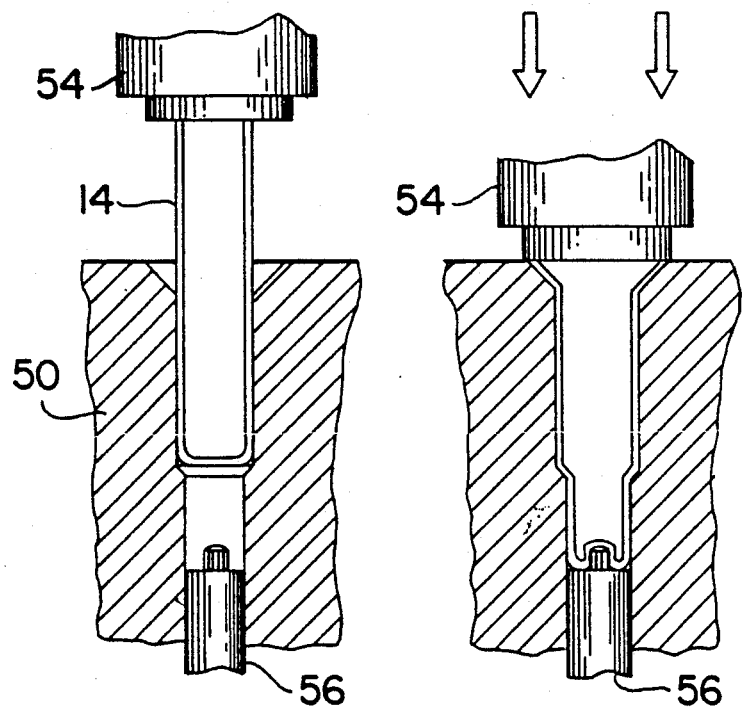
Figure 6:
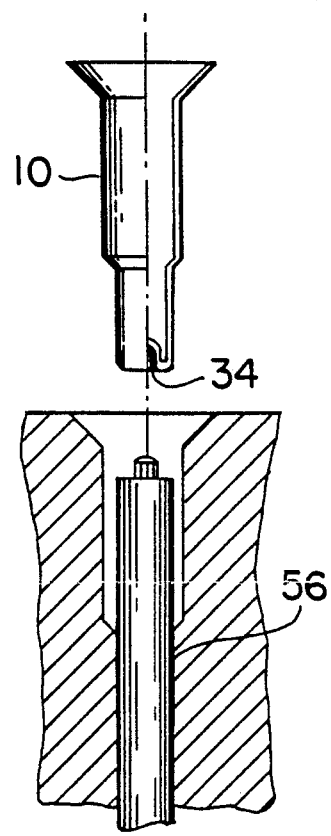

As shown in FIG. 1, a fastener element 10 for cooperating with another fastener assembly member (not shown), is composed of a metallic shell 14 surrounding a core 20 of substantially lighter material. The resulting solid body fastener element is capable of carrying significant shear, compression and tension forces, and is able to withstand significant tension loading. Further, the lightweight finished fastener element has a highly precise, high tolerance external finish. As a threaded fastener assembly element, the fastener may be threaded into a cooperating metal fastener assembly member, such as a receiving nut or a receiving threaded area of a workpiece or workpieces.

Functionally, the fastener element 10 includes a head portion 22, a shank portion 24, and a threaded or grooved portion 26. For purposes of this application the terms "threads" and "threaded portion" shall include both conventional thread patterns and any grooved surface configuration for engaging either a workpiece, workpieces, or a cooperating fastener element. Optionally, the fastener may have a drive recess 32 formed in the head portion 22, and/or a keyway 34 formed in the opposite end thereof. The head portion 22 may have either a sloped surface with a continuously varying diameter as shown in FIG. 1 or a flat-head configuration in which the edge of the head portion 22 forms a generally right angle with the shank portion 24. Both the recess 32 and the keyway 34 are provided for engagement by tools necessary for assembling the fastener to other components of a construction.

In the presently preferred embodiments the shell 14 is formed from a blank of metal, such as steel or titanium, having an inherent high strength and rigidity, even with small wall thickness. The preferred shell wall thickness of an exemplary fastener according to this invention is generally uniform and twice the height of the threaded or grooved portion 26 in the final fastener structure 10. There is a greater tendency for the shell 14 to separate from the core 20 if the thickness of the shell 14 in the threaded portion 26 of the present inventive fastener 10 is less than approximately twice the height of the groove or thread 26. Alternatively, the core 20 provides a decreasing load bearing contribution to the fastener structure 10 in embodiments where the shell wall thickness is greater than about 2.2 times the thread height. Both of these problems can be alleviated to some extent by bonding the core 20 to the shell 14, as discussed more fully below. While the thickness of the shell 14 may be generally uniform, the shear strength of the fastener 10 can be further selectively enhanced by increasing the thickness of portions of the shell 14 other than the threaded portion 26 such as, for example, the shank portion 24.

According to a first preferred embodiment of the present invention, the core 20 of a fastener 10 is made of a non-metallic compound such as an epoxy and graphite composite which is introduced into the shell 14 in either a solid or semi-liquid form. Particularly, the non-metallic core material 20 in this first embodiment is a curable compound capable of thermal cycling between semi-fluid and hardened states until finally cured by increasing the temperature above a threshold temperature contemplated by the designed use.

After being embedded in the fastener shell 14, the core 20 of pre-cured or curable non-metallic filler material is warmed and/or heated to a sufficiently flowable state, to eliminate voids in the shell 14, and to activate the chemical reaction to cause the core material to harden or cure. In a hardened state, the filler material enhances various strength factors of the fastener, particularly if the core 20 is adhesively bonded to the shell 14.

The method of manufacture of this first preferred embodiment of the present inventive fastener 10 includes the steps of forming the metal shell 14 to a preliminary configuration. Preferably, a blank of metal material is shaped into a substantially cylindrical shell with a closed bottom, and may have a substantially uniform wall thickness. The tension or load bearing characteristics of the fastener 10 may be enhanced by orienting the grains of the metal making up the shell 14. This can be done, for example, by forming the metal shell 14 into its preliminary shape by well known extrusion processes. After preliminary shaping, the metal shell 14 is substantially filled with the epoxy graphite filler material which may be pre-cured and reheated to a malleable, deformable state or, preferably, the epoxy graphite filler is introduced into the shell 14 in an uncured and malleable, deformable state. Intimate contact of the graphite filler material with the metallic outer sleeve is desirable and may be obtained through compaction and/or setting while the core material remains in a semi-fluid flowable state.

Enhanced load bearing and shear stress sharing between the core 20 and the shell 14, and consequently a stronger fastener 10, can be obtained by promoting an adhesive bond at the interface between the core 20 and the shell 14. There are several methods for obtaining this bond. An adhesive bond will normally form between the core 20 and shell 14 if the non-metallic filler material is inserted into the shell 14 while still in an uncured state and subsequently cured while residing in the shell 14. This bond can be further enhanced by roughening or abrading the inner surface of the shell 14 by any convenient method prior to inserting the filler material into the shell 14 so as to form a textured non-smooth inner surface. Further enhancement of this bond can be achieved by coating the inner surface of the shell 14 with a suitable adhesive before introducing the filler material.

If it is desired to pre-cure the non-metallic core 20 compound before insertion into the shell 14, an adhesive bond can be obtained by cleansing the inner surface of the shell 14 with a suitable "promoter" composition of various types well known in the art before inserting the core compound 20. The bond between the shell 14 and a pre-cured core 20 can also be enhanced by roughening the surface of the shell 14 inner surface and/or use of suitable adhesives.

With the shell 14 and the graphite filler or core material 20 contained in the shell 14 at an elevated temperature so that the cured or pre-cured filler material is still in at least a semi-liquid state, the filled shell is operated on in an article forming machine, shown only as a header and body die 50, between a header punch 54 and an extrusion pin 56. Upon actuation of this article forming machine, the header punch 54 forces the filled shell 14 into the body die 50 of predetermined configuration for forming the shank 24 of the shell 14 to precise external tolerances, as well as to form the head 22 thereon. As the shell 14 reaches the bottom of the die 50, the extrusion pin 56 forms the keyway 34 in the end thereof. Since the extrusion pin 56 serves as a stop for movement of the shell 14 into the die 50, the upper portion of the shell 14 is forged and deformed to the head dimensions defined by the die. During this forming and forging operation, the core material 20 is compacted and displaced within the shell as necessary to express any air pocketed therein and to fill all recesses within the shell 14.

While still warm or after pre-warming to a preferred temperature, the resulting intermediately finished shell 14 is expelled from the die 50, and moved to a final finishing station or machine (not shown). In such a machine, threads 26, are formed about a length of the shank 24 of the fastener shell 14, by known techniques preferably including thread rolling or working with dies. Thereafter, the finally formed fastener 10 is moved from the finishing station to a curing and/or treating station for curing and final solidifying of the filler material, prior to transfer to a storage station. As noted above, curing the filler material at this stage can provide an enhanced adhesive bond between the core 20 and the shell 14.

In a second embodiment of the present inventive fastener 10, a lightweight metallic compound such as aluminum or an aluminum-lithium alloy is used as the core material 20 in place of a curable compound such as a graphite based epoxy. The structure of the fastener 10 in this embodiment is the same as in the first embodiment with the core 20 made of a light metallic compound in place of the curable core previously described. In particular, the thickness of the shell 14 in the threaded or grooved portion 26 of the fastener is preferably between twice and 2.2 times the height of the thread or grooves.

The method of fabrication for this second embodiment of the fastener 10 is essentially similar to the method previously described in connection with the embodiment employing a curable non-metallic core. The shell 14 is formed into a preliminary, generally cylindrical, configuration before the metallic core is inserted. The metallic core 20 is then inserted into the preliminary shaped shell 14 with the core 20 in a solid form. To ensure satisfactory engagement between the core 20 and the shell 14 it is preferable to provide a close tolerance fit between the elements. A sufficiently close tolerance fit can be achieved by any number of well known techniques such as, for example, by press fitting the core 20 into the shell 14 or by shrink fitting (chilling the core 20 before insertion with subsequent thermal expansion providing a close tolerance fit). After inserting the core 20 into the preliminarily shaped shell 14 the combined structures are then machined essentially as discussed above to obtain the final fastener structure 10.

Thus, the resulting fastener 10 of either the first or the second embodiment is a solid high strength lightweight fastener having a lightweight, strong metallic shell 14 finished to desired external finish with high precision, high tolerance dimensional requirements. That is, the metallic shell 14 of the fastener 10 is configured to desired dimensions with a precision not possible by simply coating an inner core material with a layer of metal. Further, since the shell 14 is filled with a lighter solidified core material 20, sensitivity to deformation of the fastener 10 caused by stress during and after assembly is avoided. Also, the filled shell 14 offers a high shear strength through the shank area, as well as allowing substantial tension load transfer in the head and threaded area of the fastener 10 without damage to the inner core. That is, without any special configuration, opposing loads applying forces against the head and the threads of the fastener are dissipated primarily through the unitary metal shell. Still further, the inner core compound provides the shell the necessary solidity to eliminate a need for unique machine tools to be used for assembly of components joined by the fastener.

Intermediate or after any of the several forming steps, the non-metallic curable inner core compound of the fastener 10 may be softened, and/or solidified to the extent necessary for appropriate handling at the next step and/or final use.

It should be understood that variations and modifications of the invention may offer to those skilled in the art, and lie within the scope of the appended claims.

I claim:

1. A lightweight threaded fastener having a high resistance to shear and compression forces and capable of withstanding high tension loads, comprising:
    a metallic load bearing shell in the form of a generally cylindrical member having a flanged head portion for engaging a surface of a workpiece to be joined and a shank portion extending from said flange for extending through workpieces to be joined, said shank portion being enclosed at an end thereof opposite said head portion and including external threads in said shank extending from the closed end along at least a portion of said shank toward said head portion,
    means forming a threaded surface internal to said cylindrical member, said externally and internally threaded portion of said shank having a thickness at least twice the height of the external thread of the shank and not greater than 2.2 times the height of said external thread, and
    an internal core of material having a density less than the density of the metallic load bearing shell conformally filling the internal surfaces of the cylindrical member and bonded thereto, said internal core having mating treads complementary to the inner threaded surfaces of said cylindrical member and further including a flange portion in intimate engaging contact with the flange portion of said cylindrical member so as to form a fastener element having unitary external metal load bearing surfaces with an internal core member molded and bonded thereto wherein tension forces between the external threads of said cylindrical member and the flange portion of said cylindrical member are shared between said core member and said shell.

2. A lightweight fastener comprising
    a casing made of metal and shaped in the form of a cylindrical shell, said shell having a thickness sufficient to support shear, compression, and tensile loads, and to accept roll forming operations to form threads therein,
    said casing having a head at one end and a shank having a first portion extending from the head for a distance sufficient to pass through workpieces to be joined, and a second portion extending therefrom for an additional distance to be threaded, said casing having a hollow interior defining head and shank portions, a solid core of material conformally filling said hollow shank and head portions and made of material of lower density than the metal of said casing, and a plurality of roll-formed threads formed into the shank about said second portion, said threads forming inwardly directed annular projections in said shell and complementary depressions in the core, so that said core is mechanically engaged by said projections at one end of said fastener and by the head portion at the other end thereof, said casing being supported in shear and compression by the shear strength and compression strength of said core.

3. The fastener element of claim 2 wherein the shank portion of said self-supporting metal load bearing metal shell is enclosed at an end opposite said head portion.

4. The fastener element of claim 2 wherein said threaded shank portion has a thickness at least twice the external thread height and wherein said threaded shank portion thickness is not greater than 2.2 times said external thread height.

5. The fastener element of claim 2 wherein said internal core material is a graphite composite base material suspended in a compacted and cured epoxy resin.

6. The fastener element of claim 5 wherein said graphite composite internal core is bonded to the load bearing metal shell.

7. The fastener element of claim 5 wherein the internal surface of said metal shell is abraded to form a non-smooth surface texture.

8. The fastener element of claim 2 wherein said internal core material is a metal alloy including aluminum.

9. The fastener element of claim 2 wherein said internal core material is an aluminum-lithium alloy.

10. The fastener element of claim 2 wherein a tool engagement drive recess is formed in a head portion of the internal core.

11. The fastener element of claim 2 wherein a tool engagement keyway is formed in said cylindrical member and internal core at an end of said cylindrical member and internal core opposite said head portion.

* * * * *